DIGITAL RECORDING APPARATUS AND METHOD

Filed June 19, 1968 2 Sheets-Sheet 1

INVENTOR.
MOGHAZI F. BARKOUKI
BY Townsend & Townsend
ATTORNEYS

DIGITAL RECORDING APPARATUS AND METHOD

Filed June 19, 1968 2 Sheets-Sheet 2

INVENTOR.
MOGHAZI F. BARKOUKI
BY Townsend and Townsend
ATTORNEYS

United States Patent Office 3,478,327
Patented Nov. 11, 1969

3,478,327

DIGITAL RECORDING APPARATUS AND METHOD

Moghazi F. Barkouki, Palo Alto, Calif., assignor to Mobark Instruments, Mountain View, Calif., a limited partnership Filed June 19, 1968, Ser. No. 738,289
Int. Cl. G11b *13/00*
U.S. Cl. 340—172.5 15 Claims

ABSTRACT OF THE DISCLOSURE

Apparatus and method for recording data bits of information wherein a data storage or memory unit is coupled to a movable recording medium so that data bits initially read into the memory unit can subsequently be read out therefrom and onto the recording medium as the latter moves relative to a predetermined reference. In this way, multiple bit characters can be recorded on the recording medium. Means is provided to correlate the movement of the recording medium with the generation of the readout of the data bits from the memory unit. The apparatus can be constructed to include a pair of memory units so that information from one memory unit can be read out as information from the other memory unit can be read in.

This invention relates to improvements in digital recording devices and, more particularly, to an apparatus and method for recording digital data.

The present invention provides an improvement in the recording of digital information by providing an apparatus and method wherein the movement of a recording medium, such as a magnetic tape, is correlated with the serial readout of digital data from a temporary storage means, such as a shift register or the like. Thus, the transfer of information from a source onto the recording medium can be made without reference to the time at which the data bits are applied to the recording medium itself since the readout of the data from the storage means can be effected only after the recording medium has moved through a predetermined distance. If the recording medium advances by equal increments during the serial readout of the data, then the data bits will be recorded at equally spaced locations on the recording medium, a condition which is desired and which is compatible with equipment used for readout of the information on the recording medium.

Techniques used in the past for recording digital data on magnetic tape have generally followed one or the other of two basic approaches. One approach has been to record various data bits onto the tape when the latter is of the multiple channel type. Thus, the write head for applying the data bits to the tape has a section for each tape channel, respectively, so that each bit is recorded on a different track of the tape. Also, the bits are recorded simultaneously since the write head is located transversely of the tape. This approach requires a special type of tape and head and provides for increased equipment costs.

The other approach which is normally used is to record the bits serially on the tape after the tape drive motor has reached a relatively constant speed. To achieve the timing accuracy between the recorded bits on the tape requires the use of expensive and intricate drive motors and linkage mechanisms. However, the accurate timing of the bits is never completely achieved so that some error generally always exists in the time intervals represented in the spaces between the data bits on the tape.

The present invention overcomes the problems mentioned above with respect to the recording of digital information by providing an apparatus and method by which serial bits are temporarily stored in a storage medium and such stored bits are immediately thereafter retrieved by strobing or clocking the storage medium with signal pulses which correspond to the data-receiving positions of the tape. In this way, a plurality of data bits can be serially transferred from the storage medium which utilizes a time domain to the tape itself which utilizes a position domain. Since the position of the tape drive motor is controllable or can be synchronized to the strobing or clocking pulses, the recorded data bits will then have position accuracy but not necessarily timing accuracy. In magnetic tape recording of digatal data, the position of the data on the tape rather than when the data were recorded on the tape is of prime importance. Playback of the tape would only require continuous motion of the tape and this can be achieved by a simple drive or playback mechanism.

The approach of this invention will assure the recording of accurately spaced data bits on a movable magnetic tape under any form of non-linearity of the speed of the tape drive motor. Thus, inexpensive stepping motors or stepping mechanisms can be used to drive the tape.

The primary object of this invention is, therefore, to provide apparatus and method for recording data bits of information on a recording medium in a manner to eliminate time dependency in the application of the data bits to a record medium and to require only that the data bits be accurately positioned on the recording medium to thereby avoid timing errors normally encountered with conventional digital recording equipment requiring synchronization before recording take place.

Another object of this invention is to provide apparatus and a method of the type described wherein the data bits are temporarily stored before they are read onto the recording medium to thereby permit the readout of the stored information as a function of the movement of the recording medium itself to eliminate timing errors associated with conventional equipment.

Another object of this invention is to provide digital data recording apparatus and method which permits the reading in of one character into a first memory while another character is being read out from a second memory onto a movable recording medium all of which is done as a function of the movement of the recording medium to thereby eliminate errors due to differences in response time between the read-in mechanism and the recording medium which receives the readout information.

Other objects of this invention will become apparent as the following specification progresses, reference being had to the accompanying drawings for several embodiments of the invention.

Figure 1:
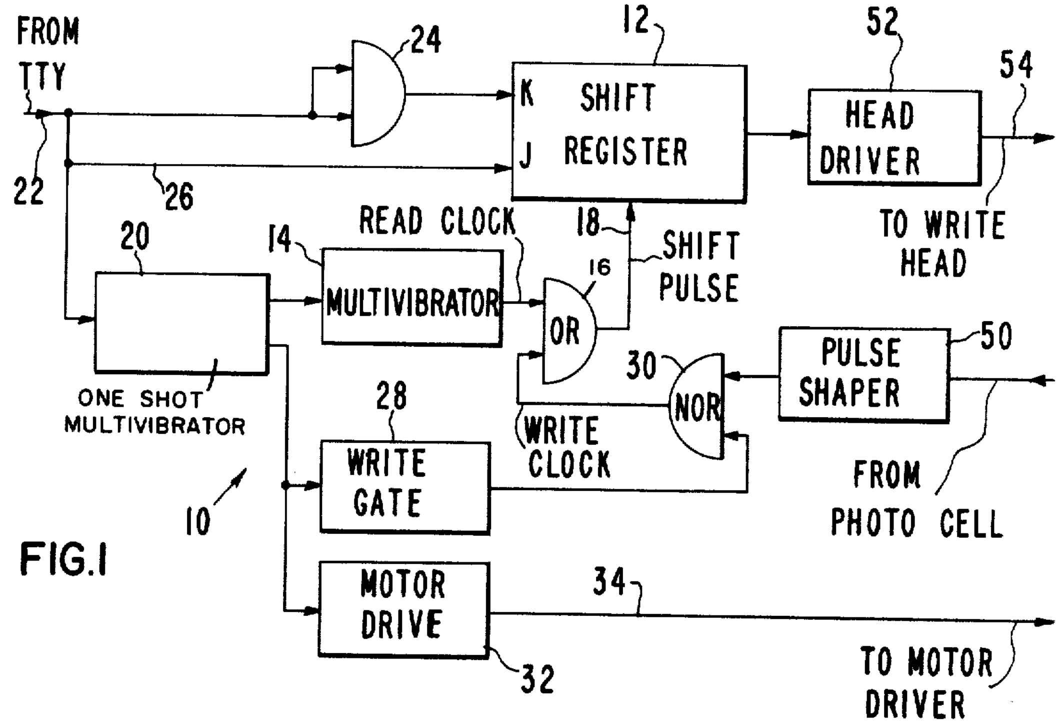
FIG. 1 is a block diagram of one embodiment of the recording apparatus.

A first embodiment of the apparatus of this invention is shown in block form in FIG. 1 and is denoted by the numeral 10. Apparatus 10 includes a memory unit such as a shift register 12 having a plurality of memory devices. Each memory device can be of any suitable construction but, for purposes of illustration, it will be described as a flip-flop capable of storing data bits at the various positions of the shift register. Each flip-flop is capable of being actuated by a signal applied to its reset terminal so that the signal at its output means can be controlled.

The actuation or clocking of each flip-flop is done by a multivibrator 14 which has an output connected to an OR gate 16 for gating clock pulses by lead 18 to the reset terminals of the flip-flops. The input to multivibrator 14 is from a signal source (not shown) such as a teletype apparatus whose signal pulse train is in the form of a series of equally spaced signal pulses. A one-shot multivibrator 20 triggers multivibrator 14 in response to the presence of the signal pulse train from the signal source. Lead 22 is connected to an AND gate 24 which serves as an inverter, the output of the gate going to the K terminal of the first flip-flop of the shift register. A second lead 26 is connected to the lead 22 and goes to the J terminal of the first memory device. In this way, the input means of shift register 12 receives the signal pulse train from the source.

One-shot multivibrator 20 also operates to trigger a second one-shot multivibrator 8 whose output goes to a NOR gate 30 connected to gate 16. Multivibrator 28 is used to allow a clocking pulse train to clock the flip-flops of the shift register after data bits have been stored in the flip-flops.

Figures 2, 3:
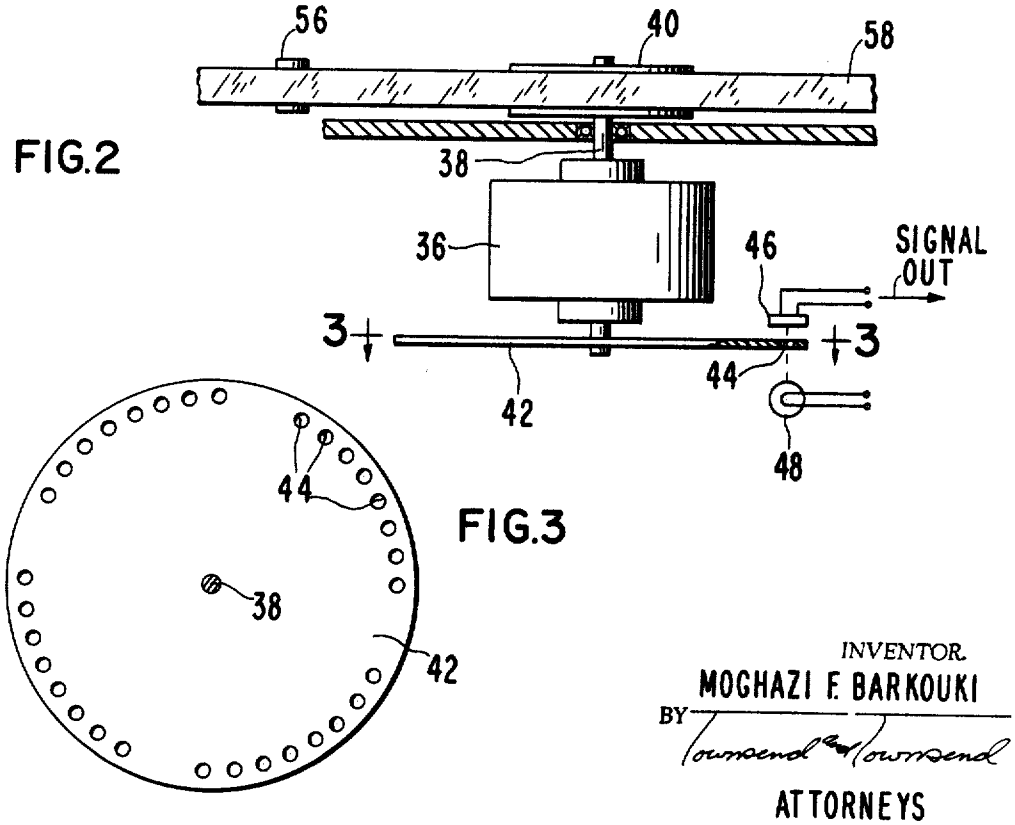
FIG. 2 is an enlarged fragmentary side elevational view of the means for correlating the readout of the information onto a recording medium with the movement of the recording medium itself.
FIG. 3 is a top plan view of a portion of the structure of FIG. 2 looking in the direction of line 3—3 of FIG. 2.

Another one-shot multivibrator 32 (FIG. 1) is connected to the output of multivibrator 20 and is connected by a lead 34 to a motor 36 (FIG. 2) whose drive shaft 38 is connected to a drive member, such as a tape capstan 40, and to a disk 42 having a number of sets of holes 44 therethrough. As shown in FIG. 3, disk 42 has four sets of holes 44 with each set containing eight holes arranged circumferentially with respect to the outer periphery of the disk. The holes of each set are equally spaced apart and are successively alignable with a photocell 46 and a light source 48 as disk 42 rotates under the influence of motor 36. As shown in FIG. 2, photocell 46 is on one side of the disk and light source 48 is on the opposite side of the disk in alignment with photocell 46.

The output of photocell 46 is connected to a pulse shaper 50 whose output is connected to gate 30. The periodic breaking of the beam from light source 48 causes signal pulses to be generated by photocell 46, which signal pulses are fed to pulse shaper 50 and ultimately to the reset terminals of the memory device of shift register 12. Multivibrator 28 gates such pulses to the shift register. Thus, such signal pulses provide clock pulses for clocking the flip-flops of the shift register.

The output of the shift register is connected to a head driver 52 whose output is coupled by lead 54 to a write head 56 (FIG. 2), head 56 being in coupled relationship to a movable recording medium, such as a magnetic tape 58 driven by capstan 40.

The operation of apparatus 10 will be described with respect to its use with teletype apparatus such as an 11-unit teletype coding system which transmits light-bit characters and whose code is composed of one start pulse, eight data bit pulses and two stop pulses. The scheme to be described uses the trailing edge of the start pulse to generate a clock pulse which strobes or clocks the eight data bit pulses into shift register 12. During the two stop pulses, motor 36 is pulsed one step wherein capstan 40 and disk 42 are rotated through a predetermined arc. This is accomplished by making multivibrator 32 operate for a time interval equal to approximately 3 to 18 milliseconds and on the trailing edge of the corresponding pulse, motor 36 is energized.

One-shot multivibrator 20 is driven by the incoming teletype signal and is triggered by the trailing edge of the teletype start pulse. Multivibrator 20 has an output signal whose pulse width is equal to the sum of the pulse widths of the eight data bit pulses from the teletype apparatus. Thus, during the triggering of multivibrator 20, multivibrator 14 clocks the pulses into shift register 12 as the input flip-flop thereof receives the data pulses from the teletype apparatus by way of leads 22 and 26. Data bits or pulses become stored in the shift register in response to the incoming teletype data pulses. The trailing edge of the output of multivibrator 20 causes multivibrators 28 and 32 to start their timing period which is of the order of 15 to 20 milliseconds. Multivibrator 32 starts motor 36 and causes capstan 40 and disk 42 to rotate simultaneously and through the same arc. As holes 44 move relative to and past photocell 46, pulses are generated in the photocell which pass through pulse shaper 50 and, in combination with the output of multivibrator 28, are applied through lead 18 to the reset terminals of the flip-flops of shift register 12. Thus, the memory devices are clocked, causing the data bits stored in the flip-flops to be read out from the shift register through driver 52 to head 56. The head energizes tape 58 as the latter moves under the influence of capstan 40, whereby the data bits are applied to the tape at specific locations thereon determined by the distance between adjacent holes 44. Since the data bits are clocks in response to the movement of holes 44 in disk 42 and since tape 58 moves through a corresponding distance, the data bits read out from the shift register are recorded at equally spaced locations on tape 58 independently of tape speed. Thus, the data bits are transferred from a time domain into a position domain. This approach will insure the recording of equally spaced data on the tape under any form of nonlinearity of motor speed. Thus, inexpensive stepping motors or stepping mechanisms can be used. Reproducing the data from the tape can be achieved by driving the tape by an inexpensive constant speed A.C. or D.C. motor or drive mechanism and the timing accuracy of the reproduced data will be maintained. The synchronous timing by the different characters on reproduction can be achieved by the proper choice of the angular spacing of the holes on disk 42 and the choice of the angular spacing between different sets of holes.

Apparatus 10 operates first to store the data bits serially in shift register 12 and then to read out the data bits in a series onto the moving tape 58. Thus, there is a time interval between successive pairs of read-in operations. Where it is desired to minimize this time interval, the apparatus shown in block form in FIG. 4 is utilized, such apparatus using two shift registers, one for reading in or storing data bits as the other one is reading out previously stored data bits onto the tape.

Figure 4:
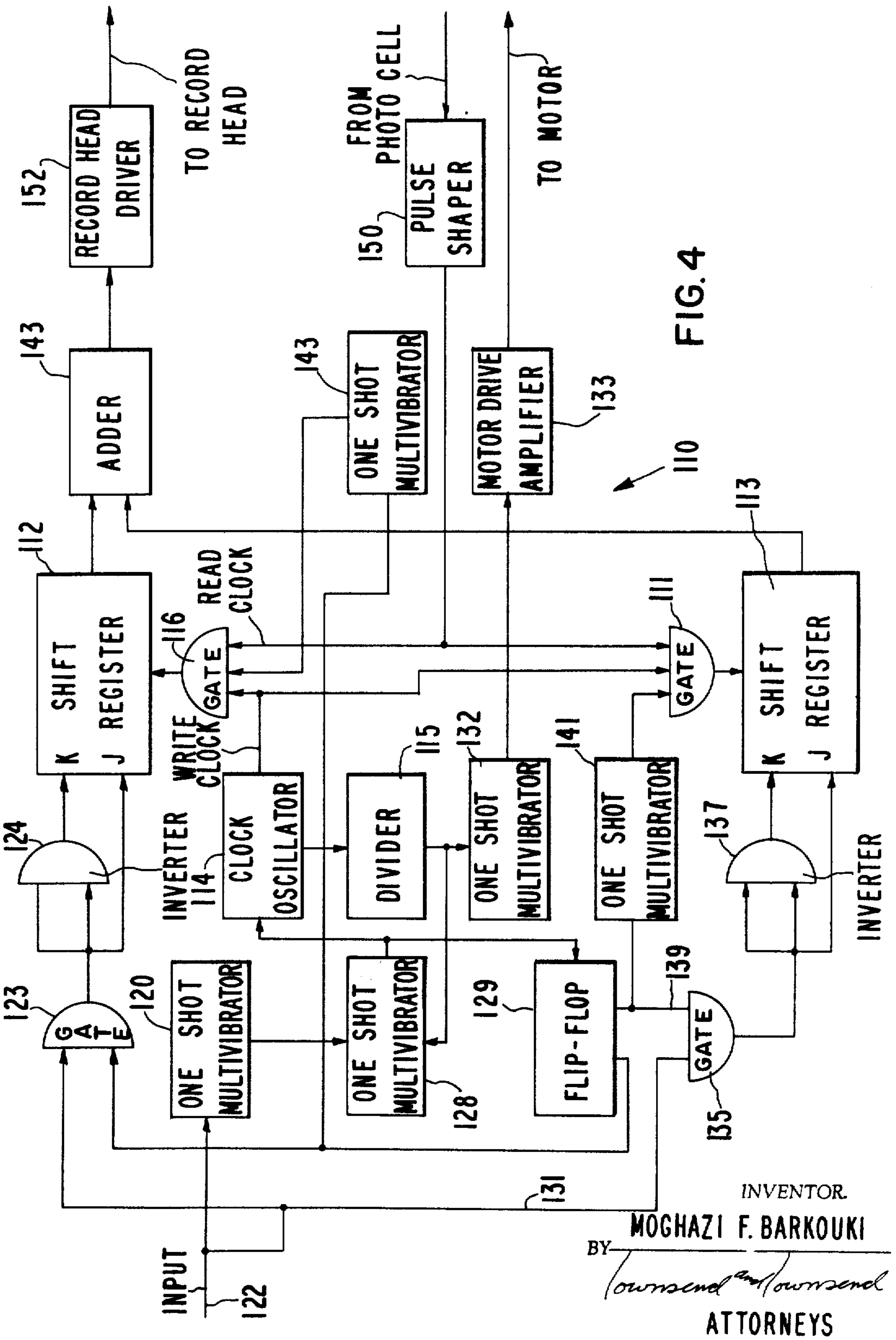
FIG. 4 is a block diagram of a second improvement of the apparatus.

The apparatus of FIG. 4 is broadly denoted by the numeral 110 and includes a pair of shift registers 112 and 113, each shift register being of essentially the same type as shift register 12 of apparatus 10 in that it contains a number of memory devices, such as flip-flops. The various elements external to and combined with registers 112 and 113 permit data bits to be stored in one of the registers while data bits previously stored in the other register can be read out therefrom.

Data bits in the form of signal pulses are directed by lead 122 into apparatus 110 and to an AND gate 123 whose output is connected to the J and K terminals of the first flip-flop of register 112 by way of an inverter gate 124. The signal from lead 122 is also directed to a one-shot multivibrator 120 whose output is connected to a second one-shot multivibrator 120 whose output is connected to a second one-shot multivibrator 128, the latter having an output coupled to a clock oscillator 114 for clocking pulses to a gate 116. The output of this gate, when the latter is opened, is connected to the reset terminals of the flip-flops of register 112, whereby the flip-flops are clocked in response to the incoming signal pulses on lead 122.

Clock oscillator 114 is also connected to a divider 115 whose output is directed to multivibrator 128 and to a one-shot multivibrator 132, the latter serving to operate a motor drive amplifier 133 whose output is connected to a motor-capstan-disk unit substantially identical in all respects to that shown in FIG. 2. This unit includes the drive motor, the tape drive capstan, the perforate disk having the spaced holes in its outer periphery and the photocell light source combination adjacent to the path of the holes. The output of amplifier 133 is connected to and operates the drive motor of the aforesaid unit, whereby the disk and capstan rotate as a unit when the motor is energized. The photocell is capable of generating signal pulses in response to the rotation of the disk and these signal pulses are directed to a pulse shaper 150 whose output is directed to gate 116. Thus, these generated signal pulses provide clock pulses for the read-out phase of operation of both registers.

Returning to one-shot multivibrator 128, it has an output which is connected to a flip-flop 129, the latter having a first output connected to a lead 131 coupled to gate 123. When a signal occurs on leads 122 and 131 simultaneously, gate 123 is opened to pass the input signal pulses to register 112. A one-shot multivibrator 143 is connected between gate 116 and lead 131 and operates to open gate 116 for the passage of clock pulses to register 112.

Input lead 122 is also connected to a gate 135 whose output is connected to an inverter gate 137 and to the J and K terminals of the first flip-flop of register 113. Flip-flop 129 has a lead 139 connected to gate 135 and this lead is also connected to a one-shot multivibrator 141, the latter serving to open gate 111 to permit passage of clock pulses to register 113.

The outputs of shift registers 112 and 113 are in parallel with each other and are connected to an adder 143 whose output is connected to a head driver 152, the latter being coupled to a write head disposed to energize a moving recording medium, such as a magnetic tape.

The operation of apparatus 110 is as follows: signal pulses, such as those described above from a teletype apparatus, are directed by lead 122 to gate 123 and to multivibrator 120. This multivibrator operates multivibrator 128 to trigger oscillator 114 for a certain period of time. Multivibrator 128 also triggers flip-flop 129 which opens gate 123 by a signal on lead 131 and also triggers one-shot multivibrator 143 to open gate 116. Thus, the flip-flops of register 112 can be clocked as signal pulses are applied to the first flip-flop thereof. Data is thereby read into register 112 and stored until a later time. Data cannot be read into register 113 at this time because gate 135 is not open.

After the data have been read into register 112, the trailing edge of the signal of multivibrator 128 triggers multivibrator 132 to, in turn, energize amplifier 133 and the drive motor connected thereto. This causes the disk connected to the motor to rotate with the tape capstan so that signal pulses are generated by the photocell as the tape moves. Such generated signal pulses are directed with the output of multivibrator 143 to gate 116 to open the latter and to permit clocking of the flip-flops of register 112. When this occurs, the data bits are read out from this register and onto the moving magnetic tape so that the data bits are stored in discrete positions on the tape determined by the relative positions of the holes in the disk.

As data bits are being read out from register 112, flip-flop 129 will have been actuated in response to the deactuation of multivibrator 128. This will open gate 135, close gate 123, and allow the next pulse train from the data source to be directed to the J and K terminals of the first flip-flop of register 113. This register is clocked by oscillator 114 and the corresponding gate 111 is opened by multivibrator 141. Thus, data bits from a second pulse train can be read into register 113 simultaneously with the reading out of data bits from register 112.

After the data have been read into register 113, the trailing edge of the signal from multivibrator 128 actuates multivibrator 132 again so that the motor having the disk is energized to rotate the disk and capstan simultaneously. This generates signal pulses which are directed to gate 111 to open the latter and clock the flip-flop of register 113. Thus, data bits are directed serially onto the recording medium driven by the capstan so that the data bits are placed at discrete positions on the recording medium.

As data bits are being read out from reigster 113, data bits can be read into register 112. The aforesaid operations can continue so long as signal pulse trains are directed into apparatus 110. This apparatus, therefore, permits signal pulse trains of minimum spacing to be recorded on the magnetic tape and to transfer the data bits from a time domain to a position domain. Thus, inexpensive stepping motors can be used to drive the tape and still achieve extremely high accuracy in the placement of the data bits on the tape.

What is claimed is:

1. Digital recording apparatus comprising: a memory capable of storing a plurality of bits of information therein; means coupled to said memory for directing signal pulses thereinto with said signal pulses signal representing said information bits; a recording medium movable relative to a predetermined reference; means coupled with said memory for serially reading out the information bits stored therein onto said recording medium as the latter moves relative to said reference; and means coupled with said recording medium and said memory for synchronizing the readout of the bits from the memory with the movement of said recording medium.

2. Apparatus for recording digital data on a recording medium comprising: a memory unit having means for receiving and storing a plurality of data bits; means coupled with said memory unit for directing a number of signal pulses thereinto with the signal pulses representing the data bits to be stored in the memory; means coupled with said memory unit for successively receiving the data bits stored therein when the data bits are read out therefrom and for applying such data bits to said recording medium as the latter is moved relative to said receiving and applying means; and means coupled to said memory unit for causing the readout of the data bits therefrom as a function of the movement of said recording medium, whereby the data bits will be disposed at predetermined locations on the recording medium.

3. Digital recording apparatus comprising: a movable recording medium adapted to receive individual data bits along its length; means coupled with said recording medium for successively applying data bits thereto as the recording medium is moved; a memory unit capable of storing a plurality of data bits therein and having an input means for receiving signal pulses corresponding to said data bits and output means coupled to said applying means to permit the data bits stored in the memory unit to be read out therefrom and to be applied to said recording medium; actuatable means coupled with said recording medium for moving the same; and means coupled with said memory unit and responsive to the actuation of said moving means for effecting the successive readout of the data bits from said output means to said applying means and thereby to said recording medium as the latter is moved relative to said applying means to assure that the data bits will be recorded on said recording medium as a function of the movement thereof.

4. Apparatus as set forth in claim 3, wherein is included a second actuatable memory unit capable of storing a plurality of data bits and having an input means for receiving signal pulses corresponding to said data bits and output means coupled to said applying means to permit the data bits to be applied to said recording medium, said actuating means including structure for simultaneously moving the recording medium as gating pulses are applied to a memory unit and means coupled with said memory units for effecting the reading in of data bits in one of the memory units and for supplying gating pulses for the other memory unit to thereby cause the latter to read out the data bits thereon.

5. Apparatus as set forth in claim 3, wherein said memory unit is capable of being actuated by a series of clock pulses to cause readout of data bits therefrom, said effecting means including structure for generating a series of clock pulses and for applying the same to said memory unit for actuating the same.

6. Apparatus as set forth in claim 5, wherein said moving means includes a stepping motor having a driveshaft and a capstan mounted on the driveshaft and coupled to the tape for moving the latter, said structure including a signal pulse source actuatable in response to the rotation of the driveshaft.

7. Apparatus as set forth in claim 6, wherein said pulse source includes a disc having a plurality of spaced openings therethrough, a photocell on one side of said disc and a light source on the opposite side of the disc, said photocell and said light source being aligned with each other and being alignable with successive openings in said disc as the latter rotates with said driveshaft.

8. Apparatus for recording digital information comprising: a shift register having a number of memory devices, each memory device adapted to be actuated by a first signal pulse and having input means for receiving and storing a second signal pulse representing a specific data bit, each memory device further having output means capable of providing a signal defining the data bit stored therein; actuatable means coupled with said shift register for gating successive first signal pulses to said memory device; means coupled with the first memory device of said shift register for applying successive second signal pulses to the input means thereof, whereby the data bits represented by said second signal pulses will be stored in said memory device when the same are actuated by said first signal pulses; means coupled to said gating means for actuating the latter as a function of the application of said second signal pulses to said first memory device, whereby successive first signal pulses will be applied to said memory device for actuating the same; a movable magnetic tape; means coupling said magnetic tape to the output means of the last memory device of said shift register to cause said magnetic tape to be energized at discrete locations thereon corresponding to the data bits stored in said memory devices as the magnetic tape moves relative to a predetermined reference and as the memory devices are actuated by a series of third signal pulses gated thereto by said gating means; and means coupled to said recording medium for simultaneously moving the same and for providing said third signal pulses to said gating means, whereby the information in said shift register can be read out therefrom as a function of the movement of the recording medium.

9. Digital recording apparatus comprising: a recording medium movable relative to a predetermined reference and adapted to receive individual data bits as it moves relative to said reference; means coupled with said recording medium for applying data bits thereto; a pair of memory units, each memory unit being capable of reading in and storing a plurality of data bits therein and having means for receiving a series of said gating pulses to effect readout of data bits therefrom to said applying means, whereby the recording medium will receive the data bits; means coupled with said recording medium for simultaneously moving the same and for generating a series of said gating pulses as a function of the movement of said recording medium; and means coupled with said memory units for effecting the reading in of data bits in one of the memory units and for supplying said generated gating pulses to the other memory unit during a first operational period and for effecting the reading in of data bits in the other memory unit and for supplying said generated gating pulses to said one memory unit during a second operational period subsequent to said first operational period.

10. Apparatus as set forth in claim 9, wherein each memory unit comprises a shift register.

11. Apparatus as set forth in claim 9, wherein said effecting means includes gate structure.

12. Apparatus as set forth in claim 9, wherein said effecting means includes a stepping motor having a drive coupled with the recording medium for moving the same, a signal pulse source actuatable in response to the actuation of said stepping motor, and gate structure coupling the stepping motor with said memory units.

13. Apparatus for recording digital data on a movable recording medium comprising: means to be adapted to be coupled with said recording medium for successively applying data bits as the recording medium is moved; a memory unit capable of storing a plurality of data bits therein and of reading out the stored data bits when the memory unit is actuated by a series of clock pulses, said memory unit having an input means for receiving signal pulses corresponding to the data bits to be stored and an output means coupled to said applying means to permit the data bits stored in and read out from the memory unit to be directed to said applying means and thereby to the recording medium; means for applying a first series of clock pulses to the memory unit when the latter receives a number of signal pulses at said input means defining the data bits to be stored thereby; and means coupled with the memory unit for applying a second series of clock pulses thereto as a function of the movement of the recording medium, whereby data bits stored in the memory unit will be read out therefrom and applied to the recording medium at predetermined locations along its length.

14. Apparatus as set forth in claim 13, wherein said means for applying said first series of clock pulses is responsive to said signal pulses received at the input means of said memory unit.

15. Apparatus as set forth in claim 13, wherein is provided actuatable power device adapted to be coupled with said recording means for moving the same, said means for applying said second series of clock pulses being responsive to the actuation of said power device, and means responsive to the signal pulses received at the input means of said memory unit for actuating said device.

References Cited

UNITED STATES PATENTS

| | | | |
|---|---|---|---|
| 3,274,909 | 9/1966 | Hauerbach | 340—172.5 |
| 3,159,810 | 12/1964 | Fire | 340—172.5 |
| 3,102,997 | 9/1963 | Dirks | 340—172.5 |
| 3,046,528 | 7/1962 | Rowe et al. | 340—172.5 |
| 3,037,194 | 5/1962 | Dirks | 340—172.5 |
| 3,031,136 | 4/1962 | Blumenthal et al. | 340—172.5 |
| 3,020,525 | 2/1962 | Garrison et al. | 340—172.5 |
| 2,993,195 | 7/1961 | Groce | 340—172.5 |
| 2,934,746 | 4/1960 | Way Dong Woo | 340—172.5 |
| 2,911,624 | 11/1959 | Booth et al. | 340—172.5 |
| 2,771,596 | 11/1956 | Bellamy | 340—172.5 |

GARETH D. SHAW, Primary Examiner